United States Patent
Wang et al.

(10) Patent No.: US 8,649,128 B2
(45) Date of Patent: Feb. 11, 2014

(54) POWER SUPPLY AND POWER SUPPLY SYSTEM INCORPORATING A PLURALITY OF POWER SUPPLIES

(75) Inventors: Bin Wang, Shanghai (CN); Hongyang Wu, Shanghai (CN); Xiaoni Xin, Shanghai (CN); Jian Jiang, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 506 days.

(21) Appl. No.: 12/916,841

(22) Filed: Nov. 1, 2010

(65) Prior Publication Data

US 2011/0107122 A1    May 5, 2011

Related U.S. Application Data

(60) Provisional application No. 61/256,639, filed on Oct. 30, 2009.

(51) Int. Cl.
*H02H 3/00*    (2006.01)
(52) U.S. Cl.
USPC .......................................................... 361/18
(58) Field of Classification Search
USPC .......................................................... 361/18
See application file for complete search history.

(56) References Cited

U.S. PATENT DOCUMENTS 3,784,893 A    1/1974  Rando
6,738,245 B2 *  5/2004  Ely .............................. 361/91.1

FOREIGN PATENT DOCUMENTS

| CN | 1388619 | 1/2003 |
|---|---|---|
| CN | 1472876 | 2/2004 |
| CN | 1812235 | 8/2006 |
| CN | 1976191 | 6/2007 |
| TW | 490906 | 6/2002 |
| TW | 200409452 | 11/2002 |
| TW | 513834 | 12/2002 |
| TW | I300644 | 9/2008 |
| TW | 200908511 | 2/2009 |
| TW | 200915833 | 4/2009 |

* cited by examiner

*Primary Examiner* — Stephen W Jackson
(74) *Attorney, Agent, or Firm* — Evan R. Witt; Kirton McConkie (57) ABSTRACT

Disclosed is a power supply for receiving an input voltage and generating an output voltage and an output current, which includes a power converter for receiving the input voltage and generating an intermediate output voltage, an output protection circuit connected to an output terminal of the power converter and including a plurality of switch circuits connected in parallel with each other. The output protection circuit is configured to limit the flowing direction of the output current by the switching operations of the switch circuits. The power supply further includes a control unit connected to the output protection circuit for issuing a plurality of control signals to the switch circuits, in which at least two of the control signals are set to allow at least two of the switch circuits to be turned off with different timings.

20 Claims, 7 Drawing Sheets

POWER SUPPLY AND POWER SUPPLY SYSTEM INCORPORATING A PLURALITY OF POWER SUPPLIES

CROSS-REFERENCE TO RELATED APPLICATION

This application claims the benefit of U.S. Provisional Application No. 61/256,639, filed on Oct. 30, 2009, and entitled "REVERSE CURRENT DETECTION W/ ORING-FET SWITCHING", the entirety of which is hereby incorporated by reference.

FIELD OF THE INVENTION

The present invention is related to a power supply, and more particularly to a power supply with enhanced power efficiency, excellent ability for accurately withstanding reverse current, and reduced manufacturing cost. Also, the relation is further related to a power supply system incorporating a plurality of power supplies.

BACKGROUND OF THE INVENTION

With the advancement of technology, electronic devices with versatile functionalities haven been developed. The electronic devices with versatility have been catered to people to fulfill their desires. Nowadays the electronic devices have gradually become a basic appliance to enrich people's lives.

The electronic products today are made up of various electronic components. The required voltages applied to electronic components are different with each other. As a result, the utility power source can not satisfy all requirements of different electronic devices. In order to supply suitable voltage to ensure the normal operation of the electronic devices, a power converter is required to convert an AC power such as utility power into a voltage tailored to power the electronic devices.

With the increase of the power consumption of electronic devices and the diversity of the applications for electronic devices, a redundancy power supply system is provided to increase the reliability of power supply and meet the operating requirement of fault tolerance. The redundancy power supply system is built by connecting a plurality of power supplies in parallel and thereby supplying power to electronic devices. The configuration of the redundancy power supply system is able to prevent the interruption of power supplying to electronic devices as a result of a faulty power supply or a malfunctioned power supply, thereby ensuring the uninterrupted operation of the electronic devices.

Figure 1:
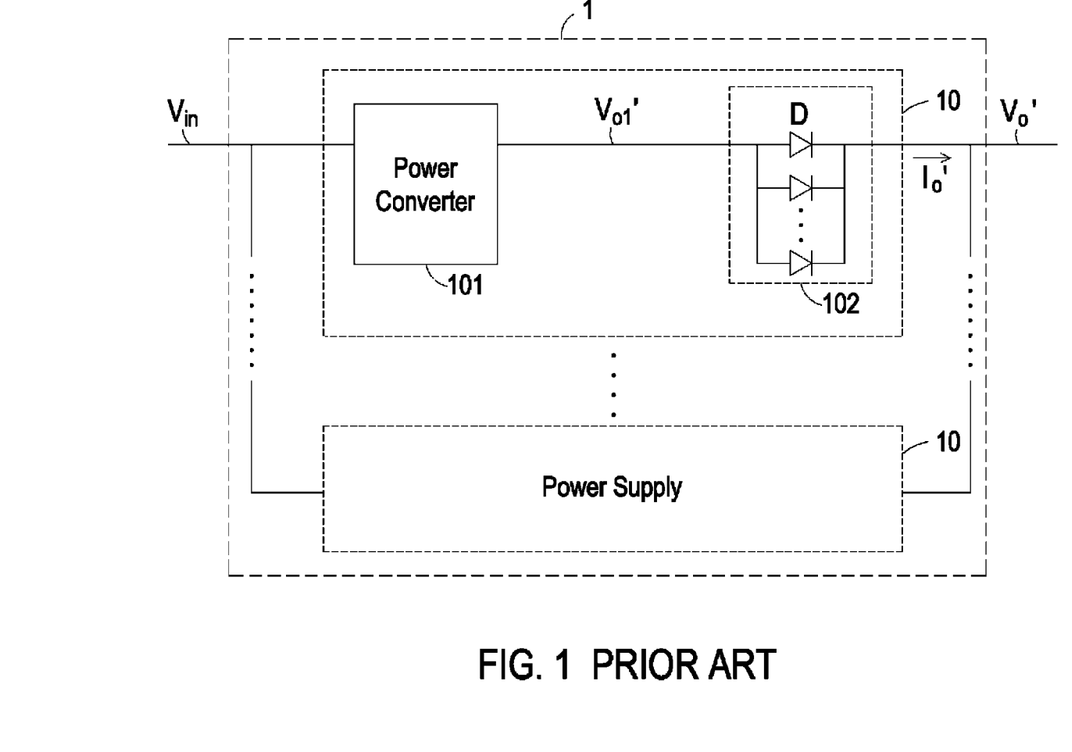
FIG. 1 is a schematic diagram showing a redundancy power supply system according to the prior art.

FIG. 1 is a schematic diagram showing a redundancy power supply system according to the prior art. As shown in FIG. 1, the redundancy power supply system 1 includes a plurality of power supplies, each of which has substantially the same configuration with one another. The redundancy power supply system 1 is made up by connecting the power supplies 10 in parallel. The power supplies receive the input voltage Vin and generate an output current Io' and a rated output voltage Vo' accordingly in order to power the systematic circuitry of an electronic device (not shown).

As shown in FIG. 1, each power supply 10 includes a power converter 101 and an output protection circuit 102. The power converter 101 is configured to receive the input voltage Vin and generate an intermediate output voltage Vo1' according to ON/OFF operations of an switch circuit of the power converter 101 (not shown). The output protection circuit 102 is made up of a plurality of diodes D that consist of an ORing circuit. The diodes D are respectively connected between the output terminal of the power converter 101 and the output terminal of the power supply 10 for limiting the flowing direction of the output current Io' flowing through the output protection circuit 102, thereby prohibiting a reverse current, for example, prohibiting the reverse current flowing from normally-operating power supply to abnormally-operating power supply as a result of the short-circuiting occurred to the abnormal power supplies, or prohibiting the reverse current flowing from abnormally-operating power supply to normally-operating power supply as a result of the high intermediate output voltage Vo1' generated by the abnormal power supplies.

Figure 2:
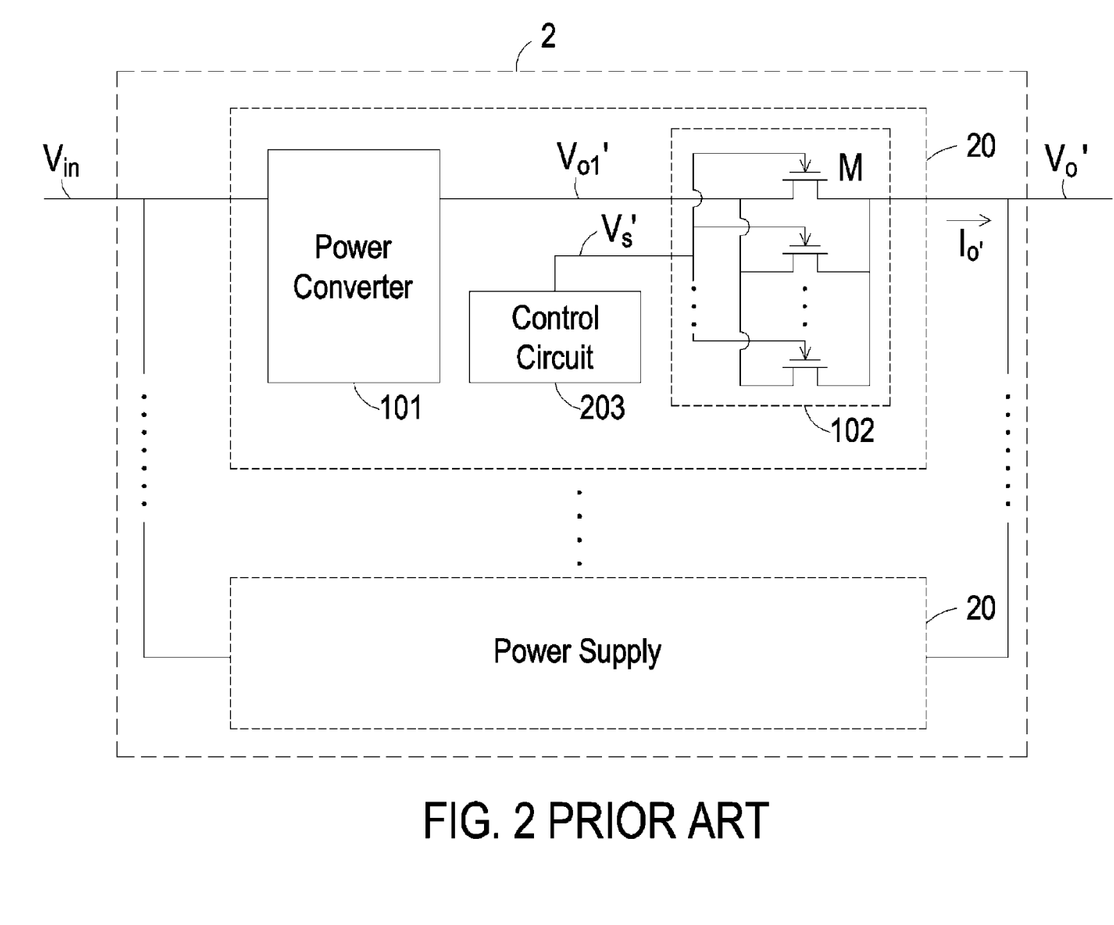
FIG. 2 is a schematic diagram showing another kind of redundancy power supply system according to the prior art.

However, the diodes D are well known as having a great conducting voltage drop Vt with a voltage level of, for example, 0.7V, and thus causing conduction loss which is significant. FIG. 2 is a schematic diagram showing another kind of redundancy power supply system according to the prior art. Referring to FIG. 2, the power supply 20 of the redundancy power supply system 2 of FIG. 2 employs a plurality of power transistors M to replace the diodes D of FIG. 1 to constitute the output protection circuit 102. As is well known in the art, power transistors M is featured in terms of low conducting impedance and low conducting voltage drop, using power transistors M to constitute the output protection circuit 102 can reduce the power loss of the power supply 20 and the redundancy power supply system 2 and increase the overall power efficiency. Nonetheless, the power transistor M is a bidirectional element and requires a control circuit 203 to control the switching of the power transistors M.

The control circuit 203 of the power supply 20 includes a comparator (not shown) for determining the magnitude of the output current Io' by the comparator, thereby issuing a control signal Vs' to control the power transistors M to turn on or off simultaneously. The comparator is configured to compare the voltage difference between the output voltage Vo' and the intermediate output voltage Vo1' (Vo'−Vo1') with a first reference voltage and a second reference voltage, thereby determining the magnitude and direction of the output current Io'. When the voltage difference is lower than the second reference voltage, the control circuit 203 generates a control signal having an enable state to control the power transistors M to turn on simultaneously. When the voltage difference is higher than the first reference voltage, the control circuit 203 generates a control signal having a disable state to control the power transistors M to turn off simultaneously.

Generally, the first reference voltage is a positive voltage representing that a reverse current is flowing into the power supply and that power transistors M are required to be turned off simultaneously. The second reference voltage is set to zero representing that no reverse current is flowing into the power supply and that power transistors M can be turned on simultaneously. In other words, the control circuit 203 of the power supply 20 is allowed to compare the voltage difference between the output voltage Vo' and the intermediate output voltage Vo1' with the second reference voltage in order to control the power transistors M to turn on in case that no reverse current is flowing into the power supply 20. Alternatively, the control circuit 203 is allowed to compare the voltage difference between the output voltage Vo' and the intermediate output voltage Vo1' with the first reference voltage in order to control the power transistors M to turn off in case that a reverse current is flowing into the power supply 20.

Nonetheless, the industry has imposed strict requirements on the energy-saving capability of electric appliances. Hence, how to elevate the power efficiency of a power supply has been a major goal for the research and design engineers to pursue. A straightforward solution to elevate the power efficiency of a power supply can be achieved by increasing the number of the power transistors M. As the power transistors are electrically connected in parallel, the overall conducting impedance of the power transistors M that is the impedance of the output protection circuit 102 will be reduced with the increase of the number of the parallel-connected power transistors M. In this manner, the power loss incurred as the output current Io' flows through the output protection circuit 102 will be lessened, and thus the power efficiency of the power supply 20 is enhanced.

Although the aforesaid solution is able to elevate the power efficiency of the power supply 20, the voltage difference between the output voltage Vo' and the intermediate output voltage Vo1' will be higher than the first reference voltage only if a sufficiently large reverse current is flowing into the power supply 20 due to the reduction of the impedance of the output protection circuit 102 caused by increasing the number of the parallel-connected power transistors M, given that the first reference voltage is unchanged. This would cause the control circuit 203 to control the power transistors M to turn off only if a sufficiently large reverse current is flowing into the power supply 20. In this manner, the power supply is unable to accurately prohibit the reverse current, which results in the damage inflicted on the internal electronic components of the power supply 20 due to the large reverse current.

Nevertheless, the aforesaid solution can be remedied by setting the first reference voltage at a lower voltage to eliminate the incapability of accurately detecting the reverse current with more power transistors and less power loss. However, the settable range of the first reference voltage depends on the input offset voltage of the comparator. If it is desired to set the first reference voltage at a lower voltage, the comparator of the control circuit 203 has to possess a small input offset voltage and higher manufacturing cost. In this manner, this would result in a higher manufacturing cost of the power supply 20.

Therefore, it is needed to develop a power supply that can obviate the aforesaid drawbacks lingered in the prior art. The invention is proposed to satisfy these needs.

SUMMARY OF THE INVENTION

An object of the invention is to provide a power supply and a power supply incorporating a plurality of power supplies for addressing the problem that the control circuit of the conventional power supply can not control the power transistors in the power supply to turn on or off with different timings. Hence, the invention can allow the power supply to accurately prohibit the reverse current from flowing into the power supply and reduce the manufacturing cost.

Another object of the invention is to provide a power supply and a power supply incorporating a plurality of power supplies. The feature of the inventive power supply is outlined by allowing the control unit of the power supply to turn on all of the switch circuits in the output protection circuit in order to increase the conducting impedance of the output protection circuit and the power efficiency of the power supply as the power supply is operating normally. As the power supply is operating abnormally, the control unit of the power supply will turn off a portion of the switch circuits in the output protection circuit in order to increase the conducting impedance of the output protection circuit, thereby the control unit can accurately turn off the other portion of the switch circuits under the condition that a relatively small reverse current is flowing into the power supply. In this manner, the output protection circuit can be turned off to prohibit the reverse current, thereby reducing the manufacturing cost.

To this end, a first aspect of the invention is focused on the provision of a power supply for receiving an input voltage and generating an output voltage and an output current. The inventive power supply includes a power converter for receiving the input voltage and generating an intermediate output voltage, an output protection circuit electrically connected to an output terminal of the power converter and including a plurality of parallel-connected switch circuits for limiting the flowing direction of the output current by the switching operation of the switch circuits, and a control unit connected to the output protection circuit for issuing a plurality of control signals respectively configured for controlling a switch circuit, in which at least two of the control signals are set to keep at least two of the switch circuits from being switched simultaneously.

The other aspect of the invention is focused on the provision of a power supply system having a plurality of power supplies for receiving an input voltage and generating an output voltage and an output current. The inventive power supply system includes a plurality of power supplies electrically connected in parallel with each other, and at least one of the power supplies includes a power converter for receiving the input voltage and generating an intermediate output voltage, and an output protection circuit electrically connected to an output terminal of the power converter and including a plurality of parallel-connected switch circuits for limiting the flowing direction of the output current by the switching operation of the switch circuits. Further, at least two of the switch circuits are kept from being switched simultaneously.

Now the foregoing and other features and advantages of the present invention will be best understood through the following descriptions with reference to the accompanying drawings, wherein:

DETAILED DESCRIPTION OF THE PREFERRED EMBODIMENT

An exemplary embodiment embodying the features and advantages of the present invention will be expounded in following paragraphs of descriptions. It is to be realized that the present invention is allowed to have various modification in different respects, all of which are without departing from the scope of the present invention, and the description herein and the drawings are intended to be taken as illustrative in nature, and are not intended to be taken as a confinement for the invention.

Figure 3:
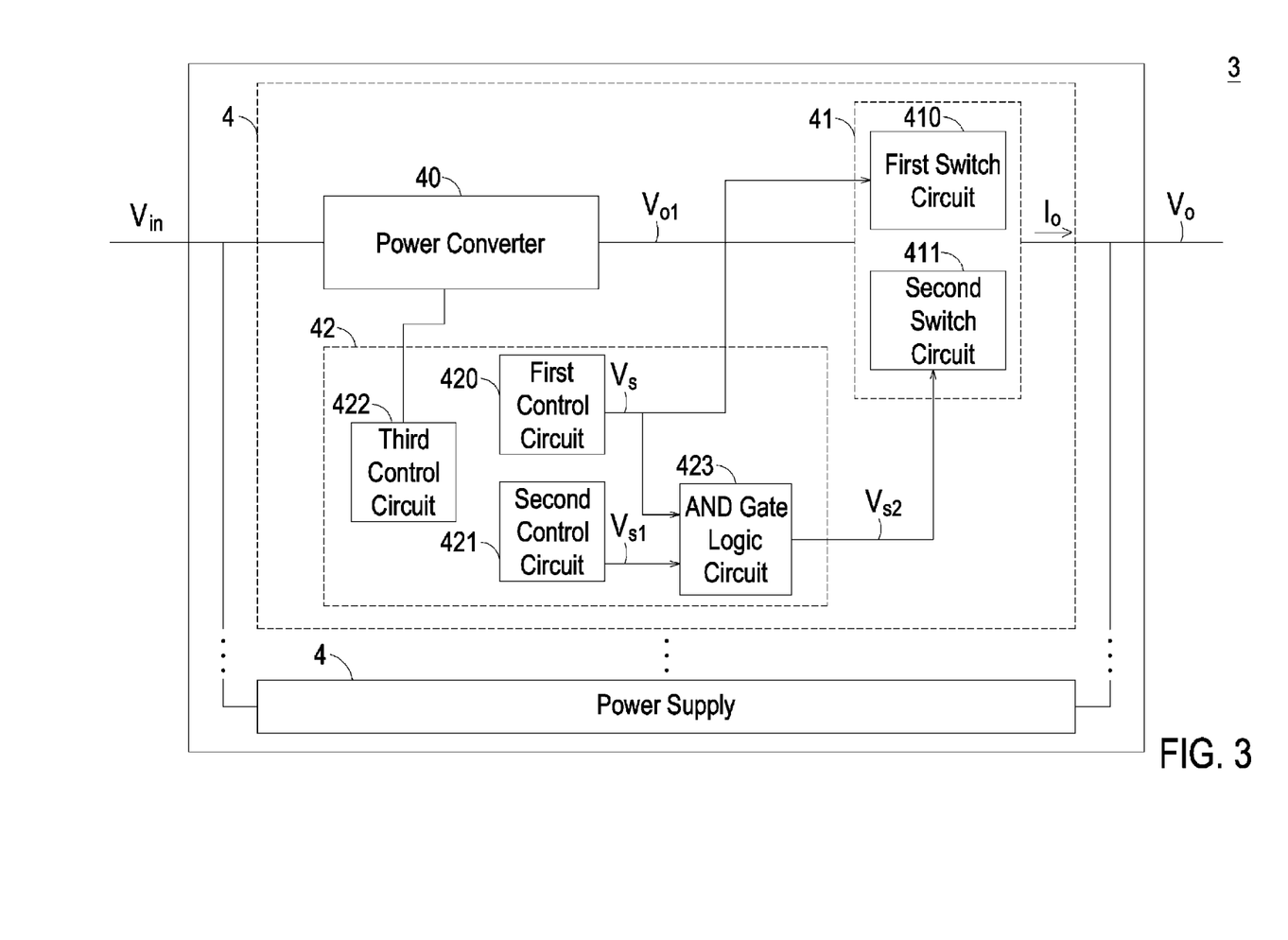
FIG. 3 is a schematic diagram showing the circuit blocks of a power supply system having a plurality of power supplies according to an exemplary embodiment of the invention.
Figure 4:
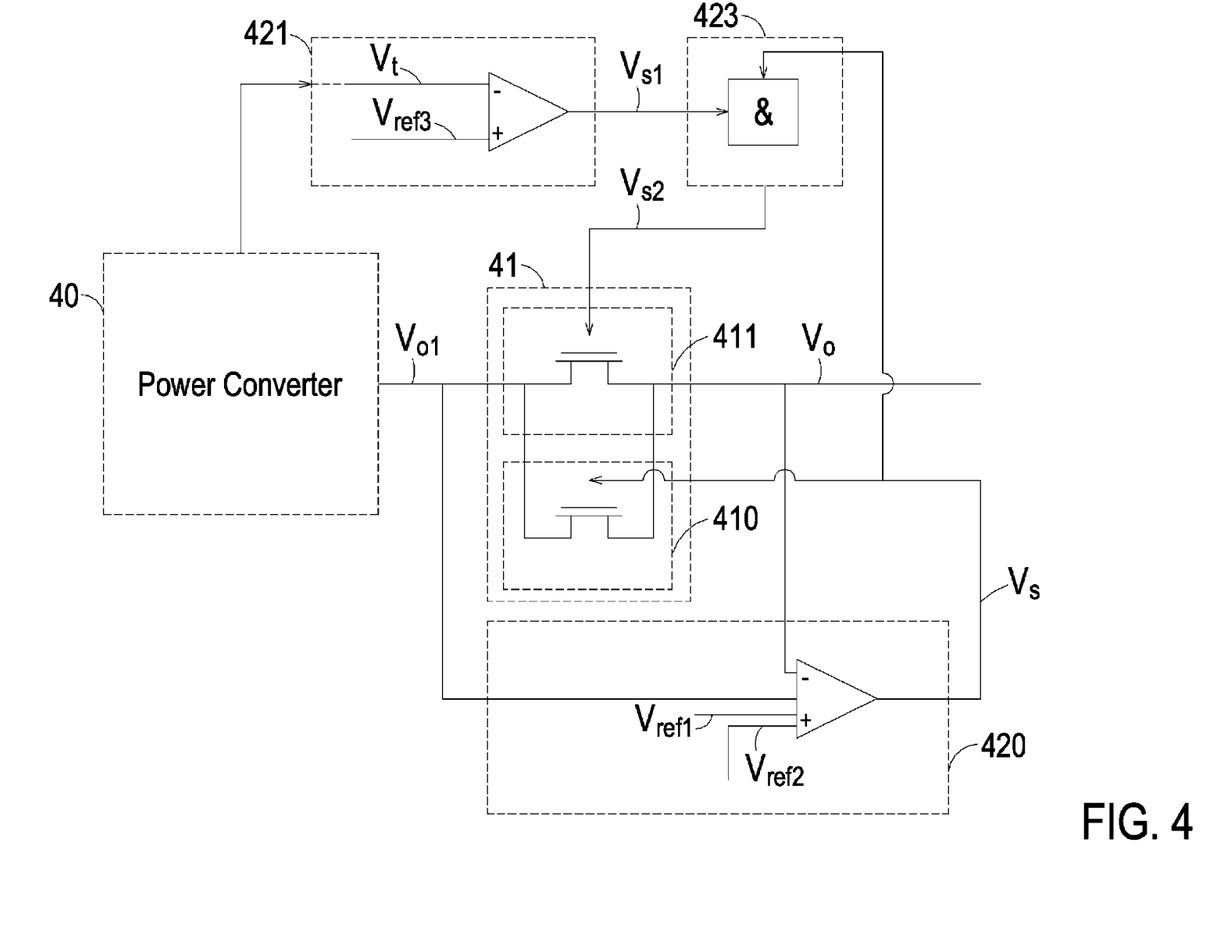
FIG. 4 is a schematic diagram showing the circuit blocks of the output protection circuit and the control circuits in the power supply according to an exemplary embodiment of the invention.

Referring to FIGS. 3 and 4, in which FIG. 3 is a circuit block diagram showing a power supply system having a plurality of power supplies according to an exemplary embodiment of the invention and FIG. 4 is circuit block diagram showing the output protection circuit and control circuits in a power supply according to an exemplary embodiment of the invention. As shown in FIGS. 3 and 4, the power supply system 3 of the invention is a redundancy power supply system and includes a plurality of power supplies 4 for receiving an input voltage Vin and outputting an output current Io and a rated output voltage Vo to a load (not shown). The power supplies 4 are connected in parallel with each other, and at least one of the power supplies 4 includes a power converter 40, an output protection circuit 41, and a control unit 42.

Figure 6:
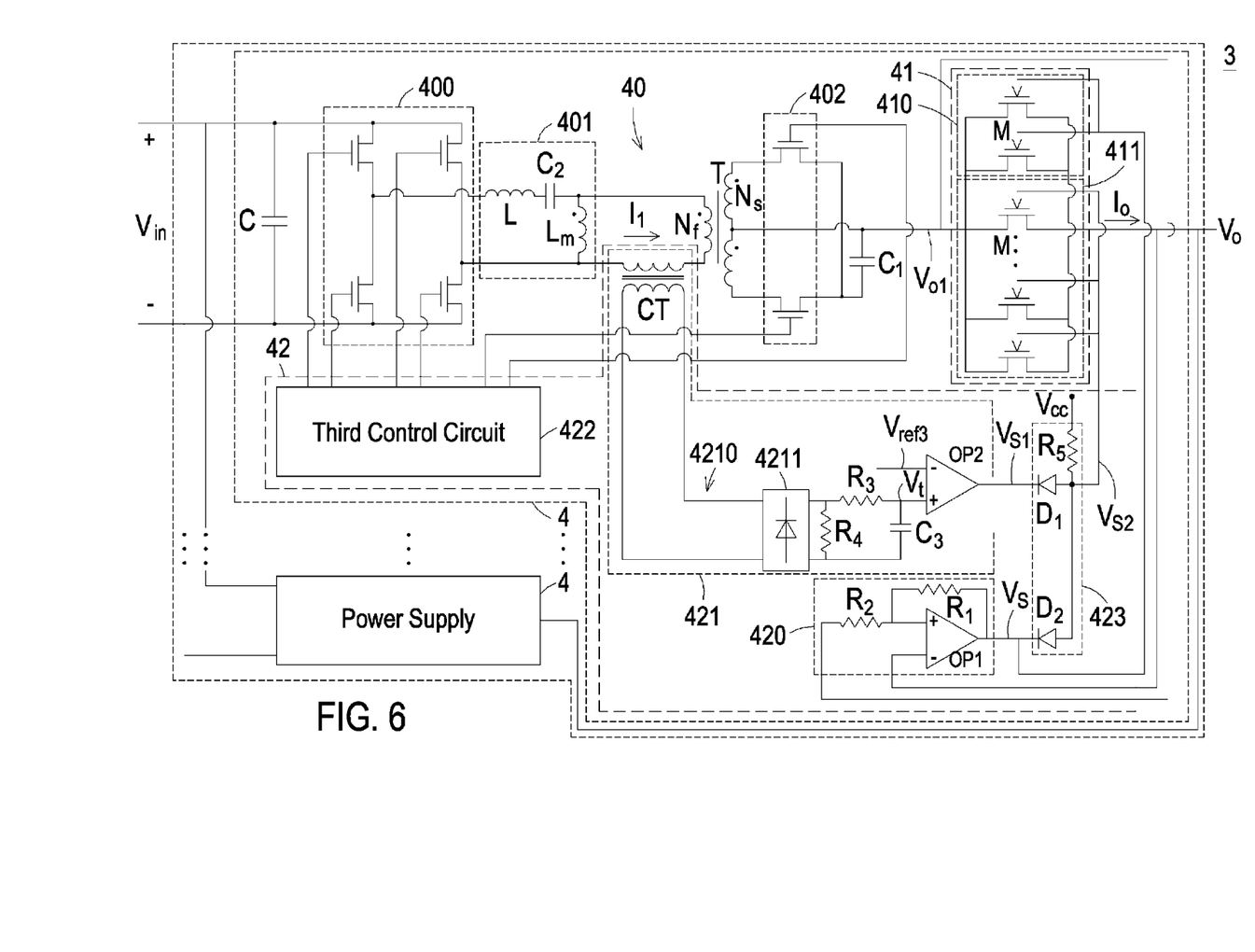
FIG. 6 is a schematic diagram showing the detailed circuitry of the power supply system according to an exemplary embodiment of the invention.

The power converter 40 is connected to an input terminal of the power supply 4 for converting the input voltage Vin into an intermediate output voltage Vo1. The output protection circuit 41 is connected between an output terminal of the power converter 40 and an output terminal of the power supply 4 and includes a plurality of parallel-connected switch circuits. In the instant embodiment, the output protection circuit 41 includes a first switch circuit 410 and a second switch circuit 411. Both of the first switch circuit 410 and the second switch circuit 411 can be made up of active switches being connected in parallel with each other. Alternatively, both of the first switch circuit 410 and the second switch circuit 411 can be made up by a single active switch. It should be noted that the configuration of the first switch circuit 410 and the second switch circuit 411 may have various modifications and derivations. In the instant embodiment, the active switch can be made up of a power transistor M as shown in FIG. 6. The output protection circuit 41 is configured to limit the flowing direction of the output current Io flowing therethrough by the switching operations of the first switch circuit 410 and the second switch circuit 411. Also, the output protection circuit 41 is configured to transfer the energy of the intermediate output voltage Vo1 to the output terminal of the power supply 4.

The control unit 42 is connected to the power converter and the first switch circuit 410 and the second switch circuit 411 of the output protection circuit 41. The control unit 42 is configured to control the power converter 40 and control the switch circuits of the output protection circuit 41 according to the magnitude of the output current Io. For example, the control unit 42 can control the first switch circuit 410 and the second switch circuit 411 to turn on or off according to the magnitude of the output current Io.

In the instant embodiment, the control unit 42 includes a first control circuit 420, a second control circuit 421, a third control circuit 422, and an AND gate logic circuit 423, in which the third control circuit 422 is electrically connected to the power converter 40 for controlling the power converter 40.

Figure 5:
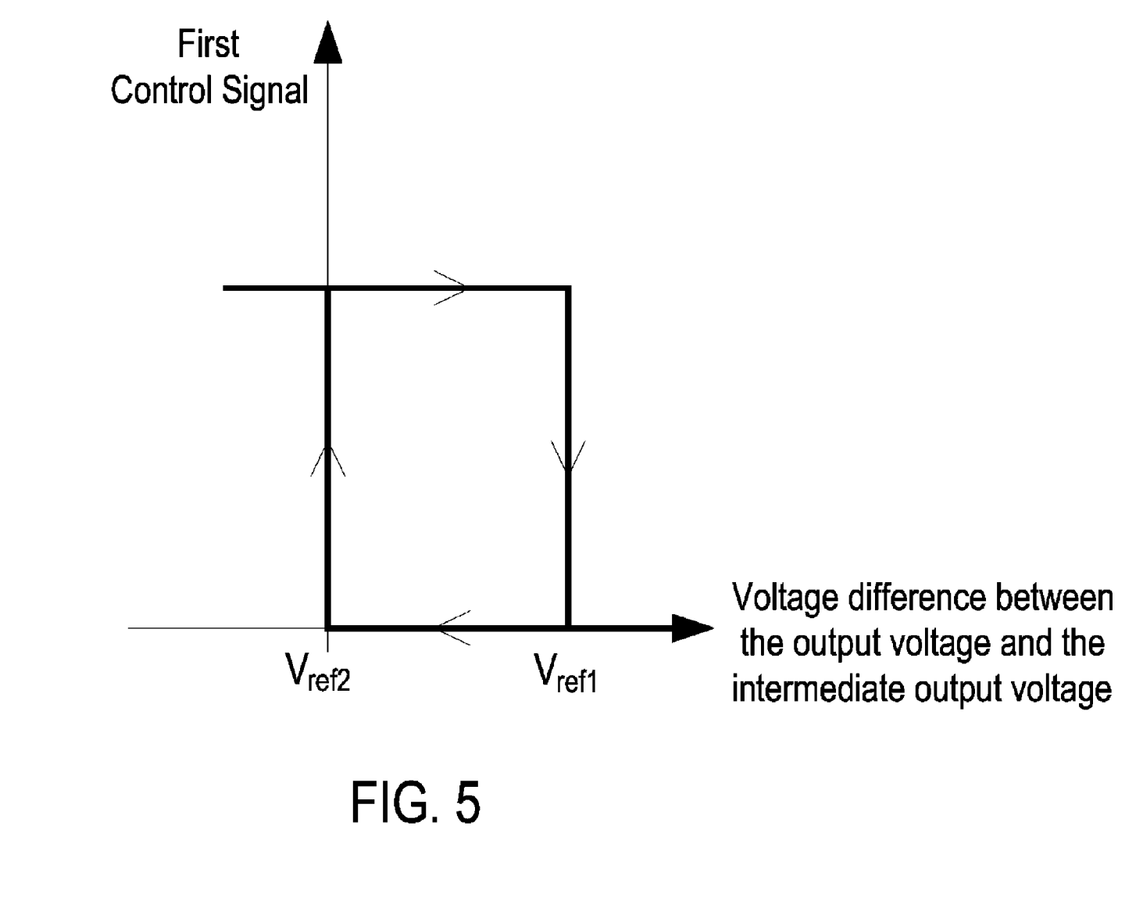
FIG. 5 is a schematic chart illustrating the control logic of the first control circuit in the power supply according to an exemplary embodiment of the invention.

Referring to FIGS. 4 and 5, in which FIG. 5 illustrates the control logic of the first control circuit 420 shown in FIG. 4. The control logic reflects the relationship between a first control signal Vs and a first reference voltage Vref1 and a second reference voltage Vref2. As shown in FIGS. 4 and 5, the first control circuit 420 is electrically connected to the control terminal of the first switch circuit 410 and the input terminal and output terminal of the output protection circuit 41. The first control circuit 420 is capable of sensing the voltage difference (Vo−Vo1) between the output voltage Vo and the intermediate output voltage Vo1 and comparing the sensed voltage difference with the first reference voltage Vref1 and the second reference voltage Vref2, thereby determining the magnitude and direction of the output current Io and generating a first control signal Vs to control the first switch circuit 410. The voltage difference between the output voltage Vo and the intermediate output voltage Vo1 is varied depending on the variation of the output current Io. For example, if the output current Io is a positive value, the voltage difference between the output voltage Vo and the intermediate output voltage Vo1 is a negative value. If the output current Io is a negative value which means a reverse current is flowing to the power supply, the voltage difference between the output voltage Vo and the intermediate output voltage Vo1 is a positive value.

Figure 7:
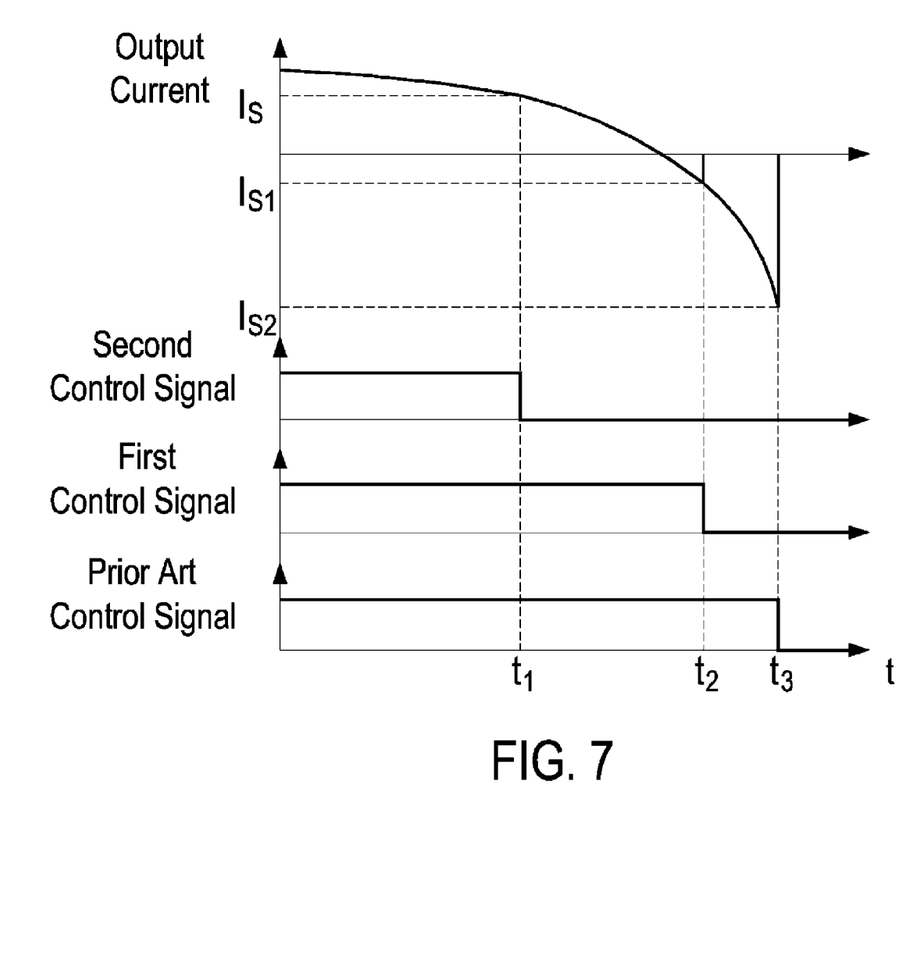
FIG. 7 is a timing chart showing the control signal waveforms and current signal waveforms applied to the invention and the control signal waveform applied to the conventional power supply.

The second control circuit 421 is electrically connected to the power converter 40 and is configured to generate a sensed voltage Vt according to a sampling signal of the power converter 40, such as a reference current which reflects the output current Io. The sensed voltage Vt is direct proportional to the reference current, and the second control circuit 421 is configured to compare the sensed voltage Vt with a third reference voltage Vref3, thereby generating a second control signal Vs1. As the reference current reflects the output current Io, the sensed voltage Vt is also relevant to the output current Io. In the foregoing embodiment, while the sensed voltage Vt equals to the third reference voltage Vref3, the output current Io reaches an alarming current level Is, as shown in FIG. 7. The alarming current level Is is set as 20 percent of the rated output current of the power supply 4. Nonetheless, the setting of the alarming current level Is is not limited to the precise form disclosed herein. For example, the alarming current level Is may vary depending on the third reference voltage Vref3. The setting of the third reference voltage Vref3 can be determined according to the capability of the power supply against reverse current which varies according to different power supply applications. The setting of the third reference voltage Vref3 can also be determined according to the ratio of the number of the switches in the first switch circuit 410 to the number of the switches in the second switch circuit 411. In the instant embodiment, for example, the ratio of the number of the switches in the first switch circuit 410 to the number of the switches in the second switch circuit 411 is 2:8. Therefore, the setting of third reference voltage Vref3 enables the alarming current level Is to be set as 20 percent of the rated output current of the power supply.

The AND gate logic circuit 423 is electrically connected to the output terminal of the first control circuit 420, the output terminal of the second control circuit 421 and the control terminal of the second switch circuit 411 for receiving the first control signal Vs and the second control signal Vs1 and performing logic AND operation to the first control signal Vs and the second control signal Vs1, thereby generating a logic control signal Vs2 to the control terminal of the second switch circuit 411 to control the second switch circuit 411.

The control logic derived from the application of the power supply of the invention is tabulated as listed in the following table:

| Mode | $V_t > V_{ref3}$ | $V_o < V_{o1}$ | $V_o - V_{o1} > V_{pre}$ | $V_{s1}$ | $V_s$ | $V_{s2}$ | $V_{s3}$ |
|---|---|---|---|---|---|---|---|
| 1 | Yes | Yes | No | Enabling | Enabling | Enabling | Enabling |
| 2 | Yes | No | No | Enabling | Last state | Last state | Last state |
| 3 | Yes | No | Yes | Enabling | Disabling | Disabling | Disabling |
| 4 | No | Yes | No | Disabling | Enabling | Disabling | Enabling |
| 5 | No | No | No | Disabling | Last state | Last state | Last state |
| 6 | No | No | Yes | Disabling | Disabling | Disabling | Disabling |

Where the reference symbol Vt is the sensed voltage Vt, the reference symbol Vo is the output voltage Vo, the reference symbol Vo1 is the intermediate output voltage Vo1, the reference symbol Vpre is the predetermined voltage range defined by the first reference voltage Vref1 and the second reference voltage Vref2, the reference symbol Vs is the first control signal Vs, the reference symbol Vs1 is the second control signal Vs1, the reference symbol Vs2 is the control signal received by the second switch circuit 411, i.e. the logic control signal Vs2. The reference symbol Vs3 is the control signal received by the first switch circuit 410. In the instant embodiment, the reference symbol Vs3 denotes the first control signal Vs.

As can be understood from the above table, under the modes 1, 2 and 3, the output current Io is higher than the alarming current Is, i.e. the sensed voltage Vt is higher than the third reference voltage Vref3. Under this condition, the first switch circuit 410 and the second switch circuit 411 will turn on or off simultaneously according to the determination of whether a reverse current is flowing into the power supply by determining whether the output voltage Vo is lower than the intermediate output voltage Vo1 and the determination of whether the reverse current is excessive by determining whether the voltage difference between the output voltage Vo and the intermediate output voltage Vo1 is larger than the predetermined voltage range Vpre. As the first switch circuit 410 and the second switch circuit 411 are allowed to turn on simultaneously under the modes 1, 2 and 3, the conducting impedance of the output protection circuit 41 can be lowered, thereby reducing the power loss caused by the output current Io flowing through the output protection circuit 41 and promoting the power efficiency of the power supply 4.

Under the modes 4, 5 and 6, the output current Io is lower than the alarming current Is, and thus the sensed voltage Vt is lower than the third reference voltage. Under this condition, the logic control signal Vs2 is transitioned to a disable state and the second switch circuit 411 is turned off first, such that the conducting impedance of the output protection circuit 41 will solely depend on the first switch circuit 410 whereby the conducting impedance of the output protection circuit 41 can be higher. Likewise, the first switch circuit 410 will turn on or off according to the determination of whether a reverse current is flowing into the power supply by determining whether the output voltage Vo is lower than the intermediate output voltage Vo1 and the determination of whether the reverse current is excessive by determining whether the voltage difference between the output voltage Vo and the intermediate output voltage Vo1 is larger than the predetermined voltage range Vpre. As the conducting impedance of the output protection circuit 41 is increased under the modes 4, 5 and 6, the voltage difference between the output voltage Vo and the intermediate output voltage Vo1 is sufficient to be responded to the first control circuit 420 in case of a relatively small reverse current flowing into the power supply 4, thereby controlling the first switch circuit 410 to turn off to prohibit the reverse current accurately.

FIG. 6 is a schematic diagram showing the detailed circuitry of the power supply system according to an exemplary embodiment of the invention. In the instant embodiment, the power converter 40 may be implemented by a full-bridge LLC series resonant converter. Nonetheless, the power converter 40 may be implemented by other kinds of power converter topologies, for example, a PWM-driven converter such as a flyback converter, a phase-shift converter, or a resonant converter such as a LLC parallel resonant converter. The LLC resonant converter of the instant embodiment includes an input capacitor C, a main switch circuit 400, a resonant circuit 401, a transformer T, a synchronous rectification circuit 402, and an output capacitor C1. The input capacitor C is electrically connected to the input terminal of the power converter 40 for filtering the input voltage Vin. The main switch circuit 400 is electrically connected between the input capacitor C and the resonant circuit 401, and includes a plurality of active switches consisted of power transistors M. The main switch circuit 400 is controlled by the third control circuit 422 to control the energy transfer of the transformer T between a primary winding Nf and a secondary winding Ns according to the switching operations of the main switch circuit 400. In other words, the transformer T can transfer the energy received at the primary winding Nf to the secondary winding Ns by means of electromagnetic induction according to the switching operations of the main switch circuit 400.

The resonant circuit 401 is electrically connected between the main switch circuit 400 and the primary winding Nf of the transformer T for generating a resonance. The resonant circuit 401 may be made up of a resonant capacitor C2, a resonant inductor L, and a magnetizing inductance Lm of the transformer T. The transformer T is a central-tapped transformer. The synchronous rectification circuit 402 is electrically connected to the secondary side of the transformer T and includes a plurality of synchronous rectifying switches consisted of power transistors M. The synchronous rectification circuit 402 is controlled by the third control circuit 422 to synchronously rectify the energy at the secondary winding Ns of the transformer T. The output capacitor C1 is electrically connected between the synchronous rectification circuit 402 and the output terminal of the power converter 40 for filtering the voltage outputted from the synchronous rectification circuit 402, thereby outputting the intermediate output voltage Vo1.

The output protection circuit 41 is configured to limit the flowing direction of the output current Io flowing therethrough by the switching operations of the first switch circuit 410 and the second switch circuit 411. Also, the output protection circuit 41 is capable of transmitting the energy of the intermediate output voltage Vo1 outputted from the power converter 40 to the output terminal of the power supply 4.

The first control circuit 420 includes a first comparator OP1, a first resistor R1, and a second resistor R2, in which the first resistor R1 is electrically connected across the non-inverting input terminal and the output terminal of the first comparator OP1. The second resistor R2 is electrically connected between the non-inverting input terminal of the first comparator OP1 and the input terminal of the output protection circuit 41. The inverting input terminal of the first comparator OP1 is electrically connected to the output terminal of the output protection circuit 41. The output terminal of the first comparator OP1 is electrically connected to the output terminal of the first control circuit 420 and the control terminals of the first switch circuit 410.

The first resistor R1, the second resistor R2, and the first comparator OP1 constitute a hysteresis comparing element. The settings of the first reference voltage Vref1 and the second reference voltage Vref2 can be varied by changing the resistance of the first resistor R1 and the second resistor R2. Also, the first control signal Vs is outputted by the first comparator OP1. The hysteresis comparing element is configured to sense the voltage difference between the output voltage Vo and the intermediate output voltage Vo1 and compare such voltage difference with the first reference voltage Vref1 and the second reference voltage Vref2. As the output current Io flowing through the output protection circuit 41 causes the voltage difference between the output voltage Vo and the intermediate output voltage Vo1 to be higher than the first reference voltage Vref1, the hysteresis comparing element issues a first control signal Vs having a disable state. Therefore, the first control circuit 420 controls the first switch circuit 410 to turn off by the first control signal Vs. Also, as the output current Io flowing through the output protection circuit 41 causes the voltage difference between the output voltage Vo and the intermediate output voltage Vo1 to be lower than the second reference voltage Vref2, the hysteresis comparing element issues a first control signal Vs having an enable state. Therefore, the first control circuit 420 controls the first switch circuit 410 to turn on by the first control signal Vs. As shown in FIG. 5, the first control signal Vs shows a hysteretic characteristic between the first reference voltage Vref1 and the second reference voltage Vref2.

In the instant embodiment, the first reference voltage Vref1 is set at a positive value. Hence, if the voltage difference between the output voltage Vo and the intermediate output voltage Vo1 is higher than the first reference voltage Vref1 which means the output current Io is determined to be a negative value. That is to say, the output terminal of the power supply 4 receives a reverse current. The second reference voltage Vref2 is set at zero. Hence, if the voltage difference between the output voltage Vo and the intermediate output voltage Vo1 is lower than the second reference voltage Vref2 which means the output current Io is determined to be a positive value. That is to say, the output terminal of the power supply 4 does not receive any reverse current.

The second control circuit 421 includes a second comparator OP2 and a current sensing unit 4210. The input terminal of the current sensing unit 4210 is electrically connected to the power converter 40, and the output terminal of the current sensing circuit 4210 is electrically connected to the non-inverting input terminal of the second comparator OP2. The current sensing unit 4210 is configured to sense a reference current in the power converter 40 in order to generate a sensed voltage Vt being proportional to the reference current to the non-inverting input terminal of the second comparator OP2. In the instant embodiment, the current sensing unit 4210 is electrically connected to the primary winding Nf of the transformer T. Therefore, the reference current is actually the operating current I1 which flowing through the primary winding Nf. As the operating current I1 is proportional to the output current Io, the ratio between the operating current I1 and the output current Io is equivalent to the turn ratio of the transformer T. Hence, the sensed voltage Vt is relevant to the output current Io as well.

The current sensing unit 4210 includes a current sensing element, a filter circuit, and a rectifying circuit 4211. In the instant embodiment, the current sensing element is electrically connected to the primary winding Nf of the transformer T and may be implemented by a current transformer CT. The rectifying circuit 4211 is electrically connected to the current transformer CT. The filter circuit is electrically connected between the non-inverting input terminal of the second comparator OP2 and the rectifying circuit 4212 and may be made up of a third resistor R3, a fourth resistor R4, and a filtering capacitor C3. The fourth resistor R4 is electrically connected in parallel with the rectifying circuit 4212. The third resistor R3 is electrically connected between the fourth resistor R4 and the filtering capacitor C3. The filtering capacitor C3 is electrically connected to the non-inverting input terminal of the second comparator OP2 and the fourth resistor R4. By employing the aforesaid circuit elements to constitute the current sensing unit 4210, the current transformer CT of the current sensing unit 4210 can sense the operating current flowing through the primary winding Nf of the transformer T and generate an AC intermediate sensing signal. The AC intermediate sensing signal is further rectified by the rectifying circuit 4211 and the filter circuit, thereby generating a sensed voltage Vt to the non-inverting input terminal of the second comparator OP2. The inverting input terminal of the second comparator OP2 is configured to receive a third reference voltage Vref3. The second comparator OP2 is configured to compare the sensed voltage Vt with the third reference voltage Vref3, thereby outputting a second control signal Vs1 having an enable state when the sensed voltage is higher than the third reference voltage Vref3 and outputting a second control signal Vs1 having a disable state when the sensed voltage is lower than the third reference voltage Vref3.

In the foregoing embodiment, as the sensed voltage Vt outputted from the current sensing unit 4210 equals to the third reference voltage Vref3, the output current Io reaches an alarming current level Is, as shown in FIG. 7. Certainly, the configuration of current sensing unit 4210 is not limited to the precise form disclosed in FIG. 3 in which the current sensing unit 4210 is electrically connected to the primary winding Nf of the transformer T. The current sensing unit 4210 can be electrically connected to an additional secondary winding (not shown) or electrically connected to the output terminal of the synchronous rectification circuit 402. In the meantime, the current sensed by the current sensing unit 4210 at these connection locations is actually relevant to the reference current. Moreover, the current sensing element can be made up of resistors. Alternatively, the current sensing unit 4210 can be replaced with a voltage sensing unit. For example, a voltage-dividing resistor can be employed to sense a sensed voltage Vt and can be electrically connected in series with the primary winding Nf of the transformer T. The voltage signal at the voltage-dividing resistor is proportional to the current with the ratio being the resistance of the voltage-dividing resistor. Hence, the control scenario of the invention can be accomplished by sensing the voltage at such voltage-dividing resistor.

In the instant embodiment, the AND gate logic circuit 423 includes a first diode D1, a second diode D2, and a fifth resistor R5. The cathode of the first diode D1 is electrically connected to the output terminal of the second comparator OP2 and the output terminal of the second control circuit 421, and the anode of the first diode D1 is electrically connected to the output terminal of the AND gate logic circuit 423. The cathode of the second diode D2 is electrically connected to the output terminal of the first comparator OP1 and the output terminal of the first control circuit 420, and the anode of the second diode D2 is electrically connected to the output terminal of the AND gate logic circuit 423. The fifth resistor R5 is connected to the output terminal of the AND gate logic circuit 423 and is configured to receive a supply voltage.

Next, the feature of the invention will be best described by demonstrating the operation of a single power supply 4. Referring to FIGS. 3 to 6 and 7, in which FIG. 7 is a timing chart showing the control signal waveforms and current signal waveforms applied to the invention and the control signal waveform applied to the conventional power supply. As shown in FIGS. 3 to 7, if the power supply 4 is normally operating, the output current Io is a positive value being higher than an alarming current level Is before the time point t1, for example, the sensed voltage Vt is higher than the third reference voltage Vref3 and the voltage difference between the output voltage Vo and the intermediate output voltage Vo1 is lower than the second reference voltage Vref2. Under this condition, the first control circuit 420 generates a first control signal Vs having an enable state to turn on the first switch circuit 410 and the second control circuit 421 generates a second control signal Vs1 having an enable state. The AND gate logic circuit 423 receives the first control signal Vs having an enable state and the second control signal Vs1 having an enable state, thereby generating a logic control signal Vs2 having an enable state to turn on the second switch circuit 411. In the meantime, both the first switch circuit 410 and the second switch circuit 411 are turned on, and thus the conducting impedance of the output protection circuit 41 is determined by the first switch circuit 410 and the second switch circuit 411 as a whole. Also, the first switch circuit 410 and the second switch circuit 411 are electrically connected in parallel with each other, which in turn results in lower conducting impedance. In this manner, the power loss caused by the output current Io flowing through the output protection circuit 41, and the power efficiency of the power supply 4 is promoted.

Nevertheless, as the power supply is operating abnormally, for example, as the power supply is short-circuited or malfunctioned, the output current Io is dropped down below the alarming current level Is from the time point t1. Under this condition, the sensed voltage Vt is lower than the third reference voltage Vref3 and the voltage difference between the output voltage Vo and the intermediate output voltage Vo1 is lower than the second reference voltage Vref2. In the meantime, the first control circuit 420 still issues a first control signal Vs having an enable state to turn on the first switch circuit 410, but the second control circuit 421 issues a second control signal Vs1 having a disable state instead. Hence, the AND gate logic circuit 423 receives the first control signal Vs having an enable state and the second control signal Vs1 having a disable state, thereby issuing a logic control signal Vs2 having a disable state to turn off the second switch circuit 411. Under this condition, the conducting impedance of the output protection circuit 41 is determined by the first switch circuit 410 only, thereby increasing the conducting impedance of the output protection circuit 41.

If the output current Io of the power supply 4 is dropped continuously down to a negative value, the power supply 4 is bound to undergo a reverse current. As the output current Io reaches a reverse current threshold value Is1 which is a negative value such that the voltage difference between the output voltage Vo and the intermediate output voltage Vo1 is higher than the first reference voltage Vref1, the first control circuit 420 issues a first control signal Vs having a disable state instead to turn off the first switch circuit 410. Hence, the AND gate logic circuit 423 receives the first control signal Vs having a disable state and the second control signal Vs1 having a disable state, thereby continuously issuing a logic control signal Vs2 having a disable state to turn off the second switch circuit 411. Under this condition, the output protection circuit 41 is turned off completely in order to prohibit the reverse current from flowing into the power supply 4.

It can be understood from the foregoing discussions that the control unit 42 is configured to determine whether the first switch circuit 410 or the second switch circuit 411 of the output protection circuit 41 will be turned on or off according to the magnitude and direction of the output current Io. As the power supply 4 is operating normally and thus the output current Io is higher than the alarming current level Is, the control unit 42 controls the first switch circuit 410 and the second switch circuit 411 to turn on in order to reduce the conducting impedance of the output protection 41 and promote the power efficiency of the power supply 4. However, as the power supply 4 is operating abnormally and thus the output current Io is lower than the alarming current level Is, the control unit 42 controls the first switch circuit 410 to turn off in order to increase the conducting impedance of the output protection 41. In this manner, as long as the power supply 4 receives a reverse current, the voltage difference between the output voltage Vo and the intermediate output voltage Vo1 is sufficient to indicate the presence of a relatively small reverse current is flowing into the power supply 4 by the determination that voltage difference between the output voltage Vo and the intermediate output voltage Vo1 is higher than the first reference voltage. Therefore, the control unit can turn off the second switch circuit to shut down the output protection circuit completely as a relatively small reverse current is flowing into the power supply 4. By contrast, the control unit 203 of the conventional power supply 20 shown in FIG. 2 is configured to control the power transistors M of the output protection circuit 102 to turn on or off simultaneously. Hence, the control unit 203 can sense that the voltage difference between the output voltage Vo1 and the intermediate output voltage Vo1' is higher than the first reference voltage and thereby generating a control signal Vs' having a disable state to shut down the output protection circuit 102 only on the condition that the power supply 20 receives a relatively large reverse current, as indicated in FIG. 7 that the conventional control signal will transition at the time point t3 where the output current Io' of the power supply of FIG. 2 reaches another reverse current threshold level Is2 that is even lower than the reverse current threshold level Is1. It can be readily understood that the power supply 4 of the invention can prohibit the reverse current without the need of a comparator with a large input offset voltage and high manufacturing cost, thereby preventing the internal electronic components from the damage caused by a large reverse current.

Alternatively, the output protection circuit 41 of the power supply 4 may be made up of three or more switch circuits. Under this condition, the control unit 42 can control three or more switch circuits to turn on or off according to the magnitude and direction of the output current Io by increasing the number of the comparators and logic circuits in the second control circuit 421. For example, the output protection circuit 41 may include a third control circuit (not shown) in addition to the first switch circuit 410 and the second switch circuit 411 shown in FIG. 3, the second control circuit 421 can control the third switch circuit by adding a third comparator (not shown) and an auxiliary logic circuit thereto, where the non-inverting input terminal of the third comparator is electrically connected to the output terminal of the current sensing unit 4210 to receive the sensed voltage Vt and the inverting input terminal of the third comparator is configured to receive a fourth reference voltage, and the input terminal of the auxiliary logic circuit is respectively electrically connected to the output terminal of the first comparator OP1, the output terminal of the second comparator OP2, and the output terminal of the third comparator. The output terminal of the auxiliary logic circuit is connected to the third comparator. In this manner, the control unit 42 can determine the magnitude and direction of the output current Io by the first reference voltage, the second reference voltage, the third reference voltage, and the fourth reference voltage, thereby controlling the three switch circuits to turn on or off with different timings.

Referring to FIG. 3, the power supply system 3 includes a plurality of power supplies 4. Some or all of the power supplies may employ the aforesaid control method to control the switch circuits in the output protection circuit. Or otherwise, the power supplies 4 can employs a single control unit or multiple control units respectively to achieve the aforesaid control method. Also, the switch circuits of the output protection circuit 41 in the power supplies 4, for example, the first switch circuit 410 and the second switch circuit 411, may have the same topology or have different topologies. That is to say, the first switch circuit 410 for each power supply 4 and the second switch circuit 411 for each power supply 4 may have the same number of power transistors respectively, or otherwise the first switch circuit 410 for each power supply 4 and the second switch circuit 411 for each power supply 4 may have different number of power transistors.

In conclusion, the invention proposes a power supply and a power supply system incorporating a plurality of power supplies. The power supply of the invention is advantageous by allowing the control unit thereof to control the switch circuits of the output protection circuit to turn on or off according to the magnitude of the output current. Hence, as the power supply is operating normally, the control unit can control the switch circuits of the output protection circuit to turn on simultaneously in order to reduce the conducting impedance of the output protection circuit, thereby promoting the power efficiency of the power supply. As the power supply is operating abnormally, the control unit can control a portion of the switch circuits of the output protection circuit to turn off in order to increase the conducting impedance of the output protection circuit. Accordingly, the control unit can control the other portion of the switch circuits of the output protection circuit to turn off on the condition that a relatively small reverse current is flowing into the power supply, thereby shutting down the output protection circuit for prohibiting the reverse current and reducing the manufacturing cost of the power supply.

While the invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A power supply for receiving an input voltage and generating an output voltage and output current, comprising:
a power converter for receiving the input voltage and generating an intermediate output voltage;
an output protection circuit electrically connected to an output terminal of the power converter and having a plurality of switch circuits electrically connected in parallel for limiting a flowing direction of the output current by switching operations of the switch circuits; and
a control unit connected to the output protection circuit for generating a plurality of control signals which are configured for controlling the switch circuits respectively, and wherein at least two of the control signals control at least two of the switch circuits to be turned off at different times.

2. The power supply according to claim 1 wherein the control signals are configured to control the switch circuits to turn on or off according to the magnitude of the output current.

3. The power supply according to claim 2 wherein the control unit is configured to compare the output current with a reference signal to control the switch circuits.

4. The power supply according to claim 3 wherein the reference signal includes at least three reference voltage values.

5. The power supply according to claim 1 wherein the switch circuits includes a first switch circuit and a second switch circuit.

6. The power supply according to claim 5 wherein the control unit includes a first control circuit connected to a control terminal of the first switch circuit and an input terminal and an output terminal of the switch circuit.

7. The power supply according to claim 6 wherein the first control circuit includes a comparing device having a hysteretic characteristic for sensing a voltage difference between the output voltage and the intermediate output voltage and comparing the voltage difference with a first reference voltage and a second reference voltage, thereby generating a first control signal having a disable state when the voltage difference is higher than the first reference voltage and generating a second control signal having an enable state when the voltage difference is lower than the second reference voltage.

8. The power supply according to claim 7 wherein the comparing device having a hysteretic characteristic includes a first comparator, a first resistor, and a second resistor, and wherein the first resistor is electrically connected between a non-inverting input terminal of the first comparator and an output terminal of the first comparator, the second resistor is electrically connected between the non-inverting input terminal of the first comparator and an input terminal of the output protection circuit, an inverting input terminal the first comparator is electrically connected to an output terminal of the output protection circuit, and an output terminal of the first comparator is connected to an input terminal of the first control circuit.

9. The power supply according to claim 7 wherein the first reference voltage is set at a positive value and the second reference voltage is set at zero.

10. The power supply according to claim 6 wherein the control unit includes a second control circuit connected to the power converter for outputting a second control signal according to a sampling signal which reflects the output current.

11. The power supply according to claim 10 wherein the second control circuit includes a current sensing unit for sensing a reference current of the power converter and outputting a sensed voltage accordingly.

12. The power supply according to claim 11 wherein the current sensing unit includes a current sensing element, a rectifying circuit, and a filter circuit, and wherein the current sensing element is electrically connected to the power converter and the rectifying circuit is electrically connected to the current sensing element and the filter circuit is electrically connected to the rectifying circuit, and wherein the current sensing unit is configured to sense the reference current of the power converter by the current sensing element and rectify and filter the output sensed by the current sensing element, thereby outputting the sensed voltage.

13. The power supply according to claim 11 wherein the second control circuit includes a second comparator having a non-inverting input terminal connected to the current sensing unit for receiving the sensed voltage and an inverting terminal configured to receive a third reference voltage, and wherein the second comparator is configured to compare the sensed voltage with the third reference voltage and output a second control signal having an enable state when the sensed voltage is higher than the third reference voltage and output a second control signal having a disable state when the sensed voltage is lower than the third reference voltage.

14. The power supply according to claim 13 wherein the output current is proportional to a rated output current when the sensed voltage equals to the third reference voltage, and wherein a ratio of the output current to the rated output current is determined by the ratio of the number of switches in the first switch circuit to the number of switches in the second switch circuit.

15. The power supply according to claim 10 wherein the control unit further includes an AND gate logic circuit connected to a control terminal of the second switch circuit, an output terminal of the first control circuit and an output terminal of the second control circuit for receiving the first control signal and the second control signal, and wherein the AND gate logic circuit is configured to perform logic AND operations to the first control signal and the second control signal, thereby generating a logic control signal to control the second switch circuit.

16. The power supply according to claim 6 wherein the control unit further includes a third control circuit connected to the power converter for controlling the power converter.

17. A power supply system for receiving an input voltage and generating an output voltage and an output current, comprising:
a plurality of power supplies electrically connected in parallel, wherein at least one of the power supplies comprises:
a power converter for receiving the input voltage and generating an intermediate output voltage; and
an output protection circuit electrically connected to an output terminal of the power converter and having a plurality of switch circuits electrically connected in parallel for limiting a flowing direction of the output current by switching operations of the switch circuits;
wherein at least two of the control signals control at least two of the switch circuits to be turned off at different timings.

18. The power supply system according to claim 17 wherein each power supply comprises:
a power converter for receiving the input voltage and generating an intermediate output voltage; and
an output protection circuit electrically connected to an output terminal of the power converter and having a plurality of switch circuits electrically connected in parallel for limiting a flowing direction of the output current by switching operations of the switch circuits;
wherein at least two of the control signals control at least two of the switch circuits to be turned off at different timings.

19. The power supply system according to claim 17 wherein the switch circuits of the power supplies are controlled by a single control unit.

20. The power supply system according to claim 19 wherein each switch circuit includes at least one active switch and each of the switch circuits of the power supplies has the same number of active switches.

* * * * *